United States Patent
Chen et al.

(10) Patent No.: US 10,416,849 B2
(45) Date of Patent: Sep. 17, 2019

(54) ELECTRONIC DEVICE AND SETTINGS MENU INTERFACE DISPLAY CONTROL METHOD

(71) Applicant: ShenZhen Dazzne Technical Limited, Shenzhen (CN)

(72) Inventors: Wei-Kun Chen, Shenzhen (CN); Zuo-Jian Ye, Shenzhen (CN)

(73) Assignee: ShenZhen Dazzne Technical Limited, Shenzhen (CN)

( * ) Notice: Subject to any disclaimer, the term of this patent is extended or adjusted under 35 U.S.C. 154(b) by 125 days.

(21) Appl. No.: 15/498,479

(22) Filed: Apr. 27, 2017

(65) Prior Publication Data
US 2017/0228112 A1 Aug. 10, 2017

Related U.S. Application Data

(63) Continuation of application No. PCT/CN2014/093388, filed on Dec. 9, 2014.

(51) Int. Cl.
*G06F 9/48* (2006.01)
*G06F 3/0482* (2013.01)
(Continued)

(52) U.S. Cl.
CPC .......... *G06F 3/0482* (2013.01); *G06F 3/0481* (2013.01); *G06F 3/04845* (2013.01); *G06F 3/04847* (2013.01); *H04N 5/23216* (2013.01)

(58) Field of Classification Search
CPC ............... G06F 3/0482; G06F 3/04845; G06F 3/04847; H04N 5/23216
See application file for complete search history.

(56) References Cited

U.S. PATENT DOCUMENTS 6,061,695 A * 5/2000 Slivka ................. G06F 17/2241
345/629
2006/0197753 A1* 9/2006 Hotelling .............. G06F 1/1626
345/173

(Continued)

FOREIGN PATENT DOCUMENTS

CN 101501755 A 8/2009
CN 102792253 A 11/2012

OTHER PUBLICATIONS

Screen captures from Vimeo video clip entitled "Digital camera prototype in action," 13 pages, uploaded on Jul. 14, 2010 by user "Miha Feus". Retrieved from Internet <https://web.archive.org/web/20100725005235/https://vimeo.com/13340044>. (Year: 2010).*

*Primary Examiner* — Jennifer N To
*Assistant Examiner* — KC Chen
(74) *Attorney, Agent, or Firm* — ScienBiziP, P.C.

(57) ABSTRACT

An interface display control method in an electronic device, includes invoking and displaying a first level submenu interface on a trigger received, the first level submenu interface including menu item arrangement area and preview area, and controlling a display screen to display multiple first level submenu items on the menu item arrangement area for ease of access by user. The multiple first level submenu items correspond to application control parameters. The method responds to user first operation to activate and second operation of user selecting. The second operation signal is responded to, and current settings value of the control parameter, corresponding to the operated first level submenu item, is displayed. The first operation signal causes display of multiple second level submenu items or multiple bottom submenu items corresponding to the operated first level submenu item.

13 Claims, 7 Drawing Sheets

(51) Int. Cl.
    *G06F 3/0484*     (2013.01)
    *G06F 3/0481*     (2013.01)
    *H04N 5/232*     (2006.01)

(56) References Cited

U.S. PATENT DOCUMENTS

2014/0157205 A1*   6/2014   Baird .................... G06F 3/0482
    715/843
2014/0191979 A1*   7/2014   Tsudik ................ G06F 3/04883
    345/173

* cited by examiner

ELECTRONIC DEVICE AND SETTINGS MENU INTERFACE DISPLAY CONTROL METHOD

FIELD

The present disclosure relates to an electronic device, and more particularly to an electronic device that can provide a user-friendly menu interface, and an interface display control system and method.

BACKGROUND

Electronic devices (such as cameras) provide a settings interface for the user to set control parameters of the electronic device corresponding to his/her preferences or actual needs. For example, a settings interface of a camera usually includes mechanical keys or virtual keys that control various camera functions, the user can set the control parameters, such as camera's video parameters, start mode, and so on.

However, due to the limitation of the display screen size of the ordinary camera, in order to avoid misuse, each level of menu interface is generally not displayed simultaneously on the display screen. That is, the settings interface of the ordinary cameras are mostly in the form of tree arrangement, and each level of menu interface is opened step by step. Therefore, when a user wants to view or change a specific control parameter, the user needs to click a corresponding key to enter a next level menu interface. If the user wants to see specific settings of other control parameters, the user needs to exit from the current menu interface and return to the previous menu interface, and then click another icon to enter a next menu interface corresponding to the icon. Accessing and manipulating the hierarchical menu interface is undoubtedly inconvenient.

SUMMARY OF THE INVENTION

An interface display control system and method is disclosed, which can provide a user-friendly menu interface to an electronic device having a small size display screen, such as a camera.

In addition, an electronic device including the interface display control system is provided.

The present disclosure provides an interface display control system, which is applied in an electronic device. The electronic device includes a display screen, an input unit, and a storage unit. The storage unit stores a plurality of application programs of the electronic device, wherein the interface display control system includes: an invoking module, configured to invoke a first level submenu interface and display the first level submenu interface on the display screen when the electronic device receives a trigger signal. The first level submenu interface at least comprises a menu item arrangement area and a preview area, and a menu item display control module, configured to control the display screen to display a plurality of first level submenu items on the menu item arrangement area. The plurality of first level submenu items corresponds to different control parameters of the application program. An input control module is also comprised, such module being configured to respond to a first operation and a second operation of one of the first level submenu items on the first level submenu interface by the user using the input unit. The module generates a corresponding first operation signal and a second operation signal, wherein the second operation is different from the first operation. A preview module, configured to respond to the second operation signal relating to the operated first level submenu item is also comprised. The display screen is controlled to display a current setting value of a control parameter corresponding to the operated first level submenu item on the preview area. The menu item display control module is also configured to respond to the first operation signal relating to the operated first level submenu item, and control the display screen to display a plurality of second level submenu items or a plurality of bottom submenu items corresponding to the operated first level submenu item on the menu item arrangement area, for the user to set or change the control parameters of the application program.

The present disclosure provides an interface display control system, which is applied in an electronic device. The electronic device includes a display screen, an input unit, and a storage unit. The storage unit stores a plurality of application programs of the electronic device, wherein the interface display control system includes: a display control module and an input control module. When the display screen displays a first level submenu interface comprising a menu item arrangement area, a preview area, a prompt area, and a path display area, the display control module is configured to control the display screen to display a plurality of first level submenu items on the menu item arrangement area, and the plurality of first level submenu items corresponds to different control parameters of the application program. The input control module is configured to respond to an operation to one of the first level submenu items on the first level submenu interface by the user and generate an operation signal; the display control module is further configured to respond to the operation signal and control the display screen to display a current setting value of the control parameters corresponding to the operated first level submenu item on the preview area, display a menu path of the plurality of first level submenu items on the path display area, and display an attribute of the operated first level submenu item on the preview area.

The present disclosure also provides an electronic device. The electronic device includes a display screen, an input unit, a storage unit, and a processor. The storage unit stores a plurality of application programs of the electronic device, and the electronic device further includes a plurality of instructions stored in the storage unit. The processor executes the instructions, and the instructions includes: an invoking module invokes a first level submenu interface and displays the first level submenu interface on the display screen when the electronic device receives a trigger signal. The first level submenu interface at least comprises a menu item arrangement area and a preview area; a menu item display control module, configured to control the display screen to display a plurality of first level submenu items on the menu item arrangement area, the plurality of first level submenu items corresponding to different control parameters of the application program; an input control module, configured to respond to a first operation and a second operation of one of the first level submenu items on the first level submenu interface by the user using the input unit, and generate a corresponding first operation signal and a second operation signal, wherein the second operation is different from the first operation; a preview module, configured to respond to the second operation signal relating to the operated first level submenu item, and control the display screen to display a current setting value of a control parameter corresponding to the operated first level submenu item on the preview area; the menu item display control module is also configured to respond to the first operation signal relating to the operated first level submenu item, and control the display screen to display a plurality of second level submenu items or a plurality of bottom submenu items corresponding to the operated first level submenu item on the menu item arrangement area, for the user to set or change the control parameters of the application program.

The present disclosure also provides an interface display control method, for being executed in an electronic device. The electronic device includes a display screen, an input unit, and a storage unit. The storage unit stores a plurality of application programs of the electronic device, wherein the method includes: invoking a first level submenu interface and displaying the first level submenu interface on the display screen when the electronic device receives a trigger signal, the first level submenu interface at least comprising an menu item arrangement area and a preview area; controlling the display screen to display a plurality of first level submenu items on the menu arrangement area, the plurality of first level submenu items corresponding to different control parameters of the application program respectively; responding to a first operation and a second operation of one of the first level submenu items on the first level submenu interface by the user using the input unit, and generating a corresponding first operation signal and a corresponding second operation signal, wherein the second operation is different from the first operation; responding to the second operation signal relating to the operated first level submenu item, and controlling the display screen to display a current setting value of a control parameter corresponding to the operated first level submenu item on the preview area; responding to the first operation signal relating to the operated first level submenu item, and controlling the display screen to display a plurality of second level submenu items or a plurality of bottom submenu items corresponding to the operated first level submenu item on the menu item arrangement area, for the user to set or change the control parameters of the application program.

Compared to the prior art, the electronic device of the present disclosure shows a plurality of menu items and the current setting value of the control parameter of any one of the menu items simultaneously in the same menu interface. The next level menu item is entered only when the user needs to change the current setting value, so that the user can quickly and easily view or set control parameters of the electronic device.

LIST OF REFERENCE NUMERALS electronic device 1
display screen 10
input unit 20
storage unit 30
processor 40
interlace display control svslem 100
invoking module 101
input control module 102
display control module 103
menu item display control module 1031
path display control module 1032
preview module 1033
main menu interface 201
first main menu item 2011
second main menu item 2012
first level submenu interface 202
first level submenu item 2020
menu item arrangement area 2021
preview area 2022
prompt area 2023
path display area 2024
second level submenu item 2025
bottom submenu item 2026

The subject matter will be described in conjunction with the accompanying drawings and the preferred embodiments.

DETAILED DESCRIPTION

Figure 1:
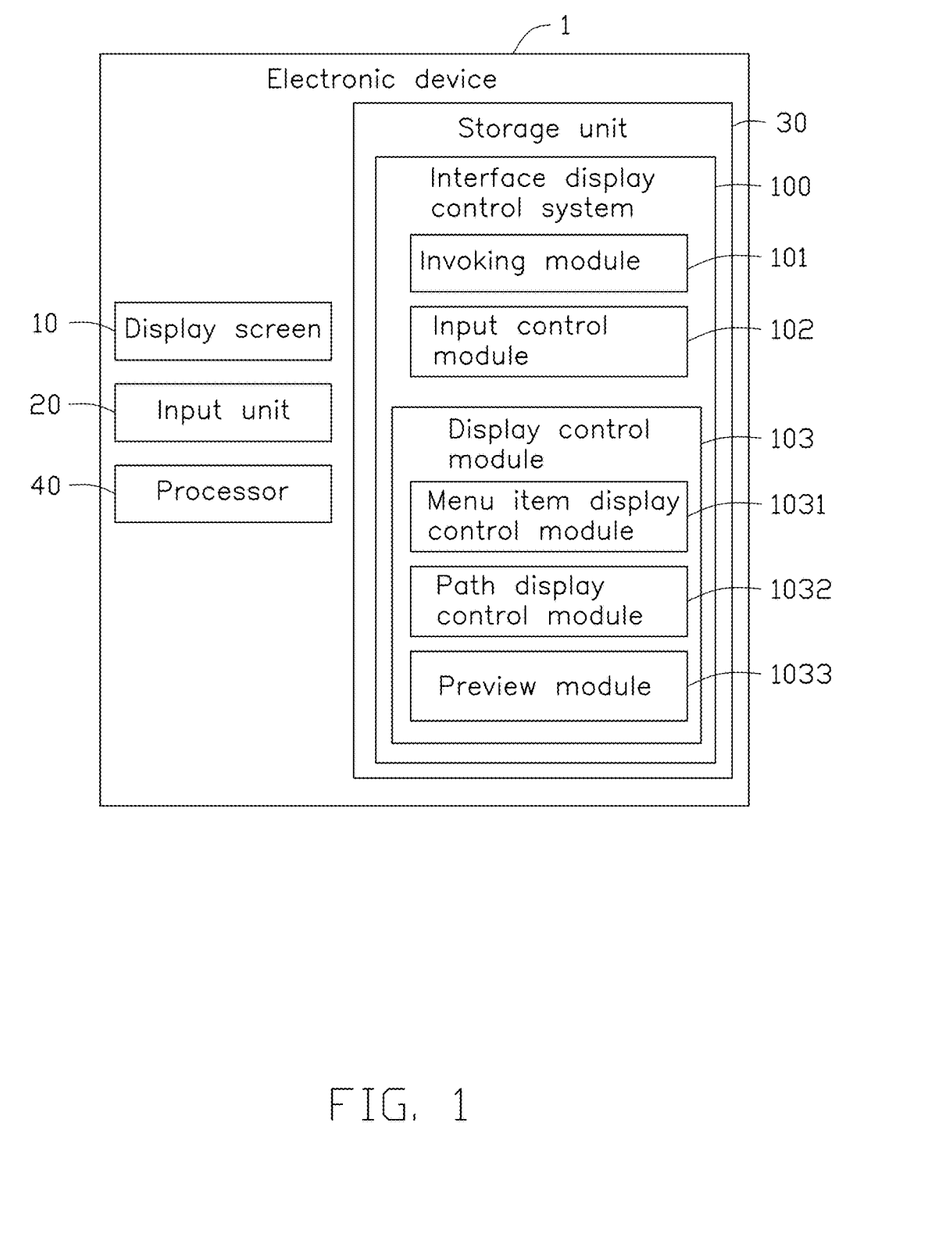
FIG. 1 is a hardware architecture diagram of an interface display control system applied to an electronic device according to a preferred embodiment of the present disclosure.

FIG. 1 is a hardware structure diagram of an example interface display control system 100 of the present disclosure. The interface display control system 100 is applied to an electronic device 1. The electronic device 1 may include a display screen 10, such as camera, smart TV, tablet, and electronic photo frame etc. The electronic device 1 also includes an input unit 20, a storage unit 30, and a processor 40. The input unit 20 is configured for enabling users to interact with the electronic device 1. The storage unit 30 is non-transitory computer readable medium and stores a plurality of application programs of the electronic device 1 and the interface display control system 100. The processor 40 is configured to perform the function of each module of the interface display control system 100, so as to control the electronic device 1 to display a user-friendly menu interface on the display screen 10 of the electronic device 1. Therefore, the user can conveniently and quickly view or set control parameters of the application programs of the electronic device 1.

The input unit 20 may be a touch screen, such as a capacitive touch screen, a resistive touch screen, etc. For examplary embodiment, the input unit 20 is a capacitive touch screen covering the display screen 10. The user can use an input device, such as stylus, finger, to click or double-click menu interface items on the menu interface. The input unit 20 may also be a mechanical input unit, such as a button, a lever, a flywheel, etc.

In this embodiment, the interface display control system 100 includes an invoking module 101, an input control module 102, and a display control module 103.

The invoking module 101 is configured for invoking a main menu interface 201 (see FIG. 2) and displaying the main menu interface 201 on the display screen 10. The main menu interface 201 displays a first main menu item 2011 so as to enable the user to view or set control parameters of the application programs of the electronic device 1. The main menu interface 201 also shows a plurality of second main menu items 2012 corresponding to the application programs. The user can operate the second main menu items 2012 through the input unit 20 to activate corresponding application programs of the electronic device 1. In this embodiment, the electronic device 1 is a video camera, and the application programs include a video maker software and a photo maker software.

Figure 2:
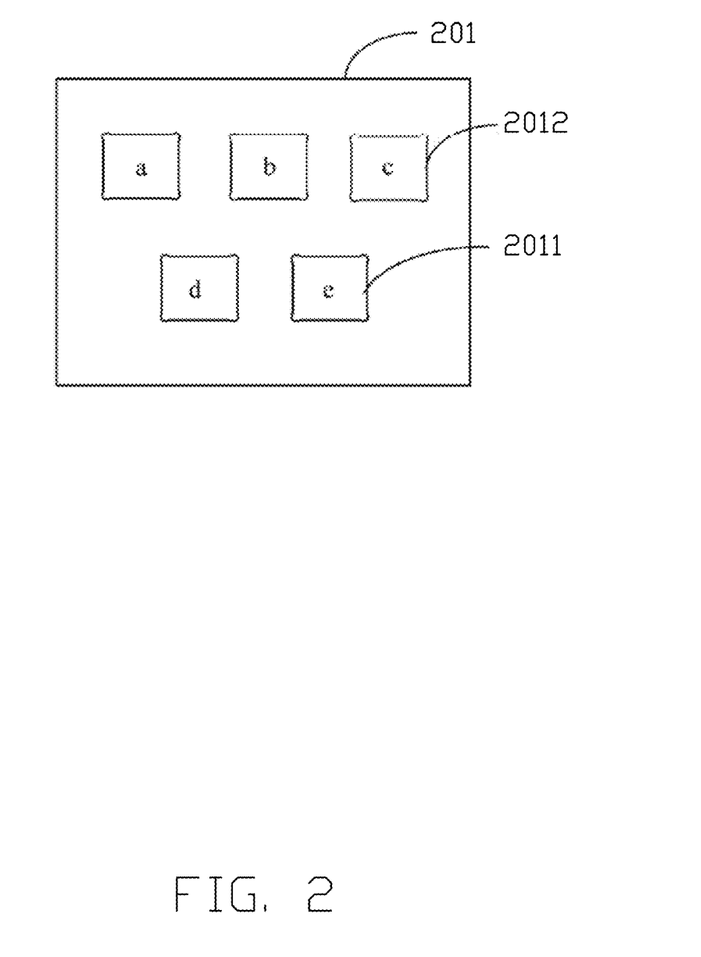
FIG. 2 is a schematic diagram of a main menu interface displayed on the electronic device of FIG. 1.

The input control module 102 is configured to respond to a first operation on the first main menu item 2011 on the main menu interface 201 by the user and generate a first operation signal. The input control module 102 is also configured to respond to a first operation on one of the second main menu items 2012 on the main menu interface 201 by the user and generate a first operation signal. The first operation signal corresponds to the second main menu item 2012, to activate an application program, which is a prior art, so there is no need to go further on this issue.

Figure 3:
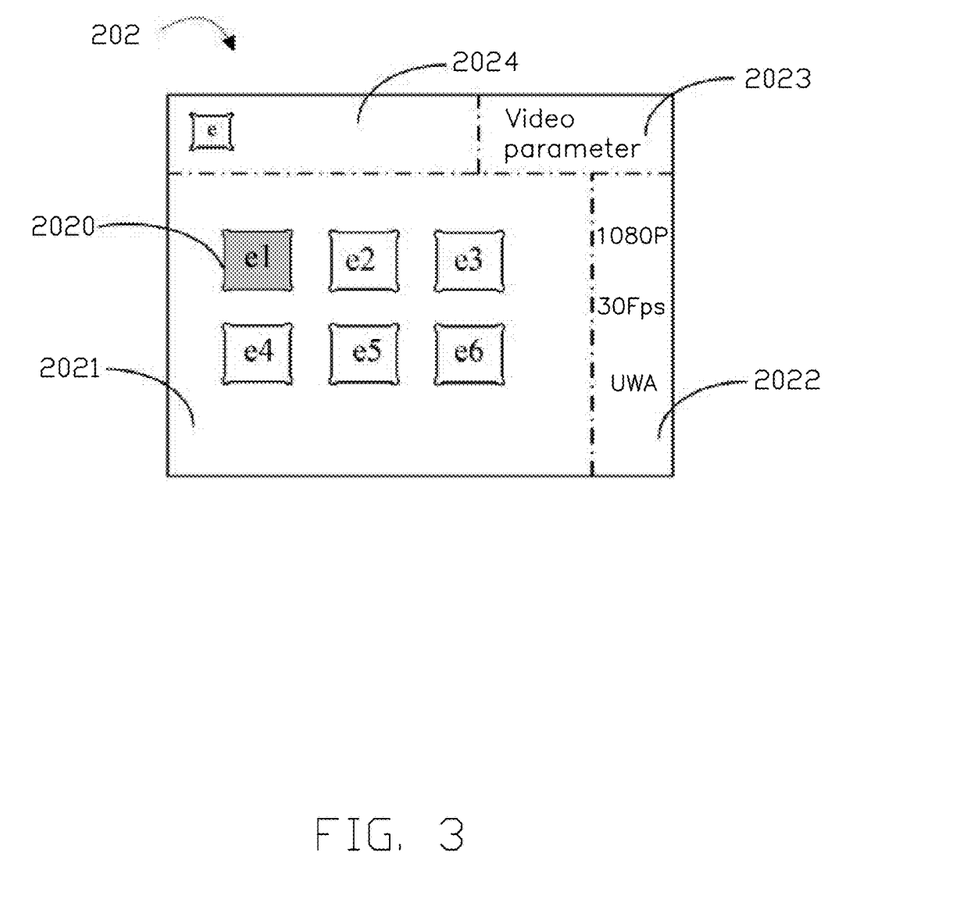
FIG. 3 is a schematic diagram of a first level menu interface displayed on the electronic device of FIG. 1.

The invoking module 101 is also configured to respond to the first operation signal corresponding to the first main menu item 2011, invoke a first level submenu interface 202 under the main menu interface 201, and display the first level submenu interface 202 on the display screen 10. The first level submenu interface 202 includes a menu item arrangement area 2021, a preview area 2022, a prompt area 2023, and a path display area 2024. The menu item arrangement area 2021, preview area 2022, prompt area 2023, and the path display area 2024 are respectively located on a lower left position, a lower right position, a higher right position, and a higher left position of the first level submenu interface 202. In other embodiments, the position of the menu item arrangement area 2021, preview area 2022, prompt area 2023, and path display area 2024 on the first submenu interface 202 may also be changed according to actual situation.

In other embodiments, the invoking module 101 is also configured to invoke the first level submenu interface 202 when the electronic device 1 receives other trigger signals. For example, the input unit 20 includes a plurality of mechanical keys, and the input control module 102 may generate the trigger signal when the user presses a predetermined mechanical key, so as to control the invoking module 101 to invoke the first level submenu interface 202.

In this embodiment, the display control module 103 further includes a menu item display control module 1031, a path display control module 1032, and a preview module 1033.

The menu item display control module 1031 is configured to control the display screen 10 to display a plurality of first level submenu items 2020 corresponding to the first main menu item 2011 on the menu item arrangement area 2021, and the plurality of first level submenu items 2020 corresponds to different control parameters of the application program. In the present embodiment, the control parameters corresponding to the plurality of first level submenu items 2020 include video parameters, camera parameters, continuous capture parameters, time-lapse parameters, and so on.

The path display control module 1032 is configured to control the display screen 10 to display a plurality of menu paths of the first level submenu items 2020 on the path display area 2024, to prompt the user as to the path from the main menu interface 201 to the first level submenu items 2020. In this embodiment, the menu path includes thumbnails of the first main menu items 2011.

The input control module 102 is also configured to respond to a first operation and a second operation which are applied to one of the first level submenu items 2020 on the first level submenu interface 202 by the user through the input unit 20, and generate a first operation signal and a second operation signal. In the present embodiment, the input unit 20 is a touch screen, the first operation is the user double-clicking the first level submenu item 2020 to open the first level submenu item 2020. The second operation is the user single-clicking the first level submenu item 2020 to select the first level submenu item 2020. In other embodiments, the input unit 20 includes a plurality of mechanical keys, and the first operation and second operation are created by the user operating different mechanical keys to open and select the first level submenu item 2020.

The preview module 1033 is configured to respond to the second operation signal relating to the operated first level submenu item 2020, and control the display screen 10 to display a current setting value of the control parameters corresponding to the operated first level submenu item 2020 on the preview area 2022. The preview module 1033 is also configured to display an attribute of the operated first level submenu item 2020. The attribute is a name of the operated first level submenu item 2020. In the present embodiment, before the user operates the first level submenu item 2020 on the first level submenu interface 202, a current setting value of the control parameter corresponding to the first one of the first level submenu item 2020 on the menu item arrangement area 2021 is acquiescently displayed on the preview area 2022. An attribute of the first one of the first level submenu item 2020 on the menu item arrangement area 2021 is acquiescently displayed on the prompt area 2023. As shown in FIG. 3, the operated first level submenu item 2020 or the acquiescently displayed first one of the first level submenu items 2020 is highlighted (e.g., displayed in another color).

This menu item display control module 1031 is configured to respond to the first operation signal corresponding to the operated first level submenu item 2020, and control the display screen 10 to display a plurality of second level submenu items 2025 (see FIG. 4) or bottom submenu items 2026 (see FIG. 6) corresponding to the operated first level submenu item 2020 on the menu item arrangement area 2021.

Figure 4:
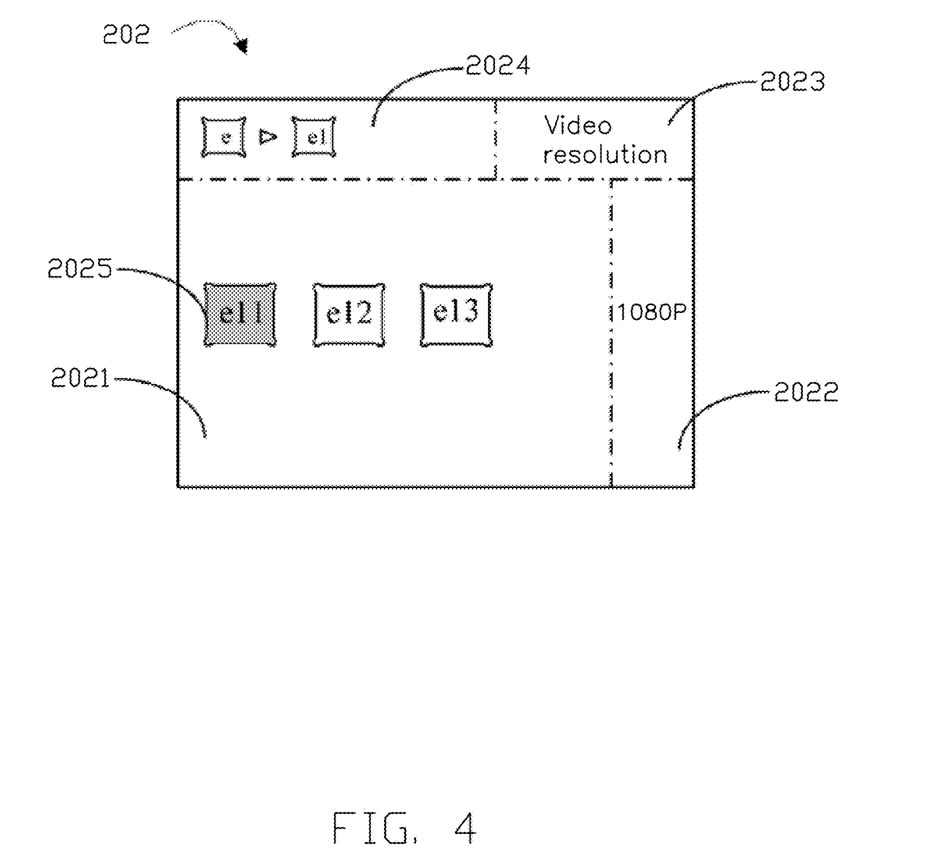
FIG. 4 is a schematic diagram showing a plurality of second level submenu items displayed when one first level submenu item on the first level menu interface of FIG. 3 is selected.
Figure 6:
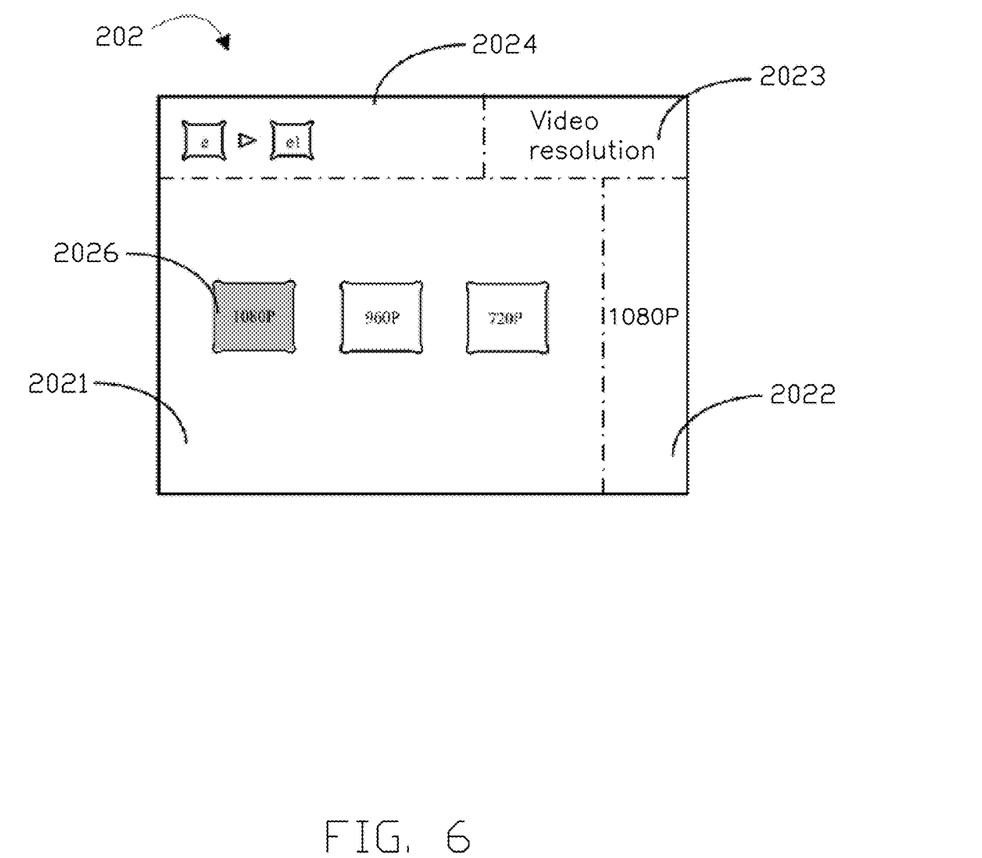
FIG. 6 is a schematic diagram showing a plurality of bottom submenu items displayed when another second level submenu item on the first level menu interface of FIG. 3 is selected.

Referring to FIGS. 4 and 6, the path display control module 1032 is also configured to control the display screen 10 to display a menu path of the plurality of second level submenu items 2025 or the bottom submenu items 2026 on the path display area 2024, to prompt the user as to the path from the main menu interface 201 to the second level submenu items 2025 or the bottom submenu items 2026. In this embodiment, the menu path includes thumbnails of the main menu items 2011 and the operated first level submenu items 2020. The thumbnails of the main menu item 2011 and the operated first level submenu item 2020 are listed on the path display area 2024 according to an order of operations.

Figure 5:
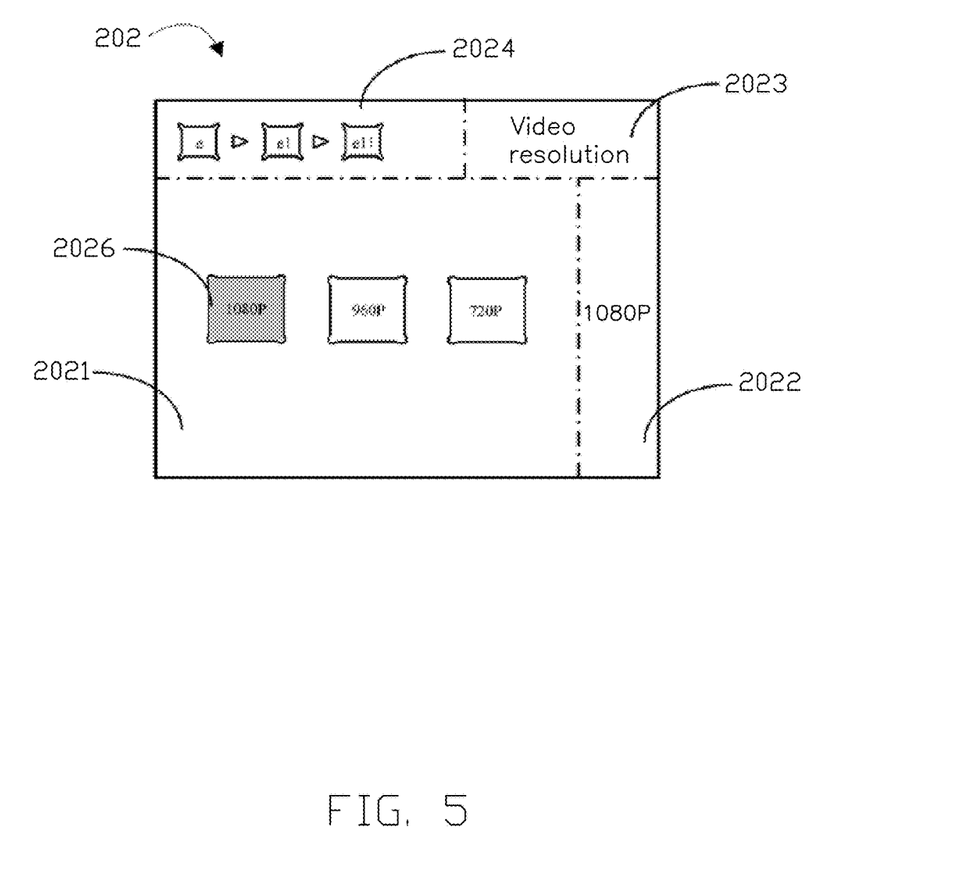
FIG. 5 is a schematic diagram showing a plurality of bottom submenu items displayed when one second level submenu items on the first level menu interface of FIG. 4 is selected.

Referring to FIGS. 3-5 together, when the number of control parameters corresponding to the operated first level submenu item 2020 is greater than one (for example, the control parameters corresponding to the operated first level submenu item "e1" include video resolution (1080P), frame rate (30 fps), and field of view angle (UWA), see FIG. 3), a plurality of second level submenu items 2025 is displayed on the menu item arrangement area 2021, which are relevant to a plurality of control parameters (see FIG. 4, the control parameters corresponding to the menu items "e1", "e2", and "e3" are video resolution, frame rate, and field of view angle). When the user performs a second operation to one of the second level submenu items 2025, the current value of control parameters of the operated second level submenu item 2025 is displayed on the preview area 2022, and the attributes of the operated second level submenu item 2025 are displayed on the prompt area 2023. When the user performs a first operation to one of the second level submenu items 2025, the menu item display control module 1031 further controls the display screen 10 to display a plurality of bottom submenu items 2026 corresponding to the operated second level submenu item 2025 on the menu item arrangement area 2021 (see FIG. 5), so that the user can set or change the values of the control parameters corresponding to the second level submenu item 2025.

FIG. 3 and FIG. 6 show that when there is only one control parameter corresponding to the operated first level submenu item 2020, a plurality of bottom submenu items 2026 of the control parameter is directly displayed on the menu item arrangement area 2021.

It will be appreciated that in other embodiments, the prompt area 2023 and the path display area 2024 may be omitted. Different letters are used to distinguish between different menu items in FIGS. 2-4, but the appearance or display of the menu items is not limited to that shown in FIGS. 2-4.

Figure 7:
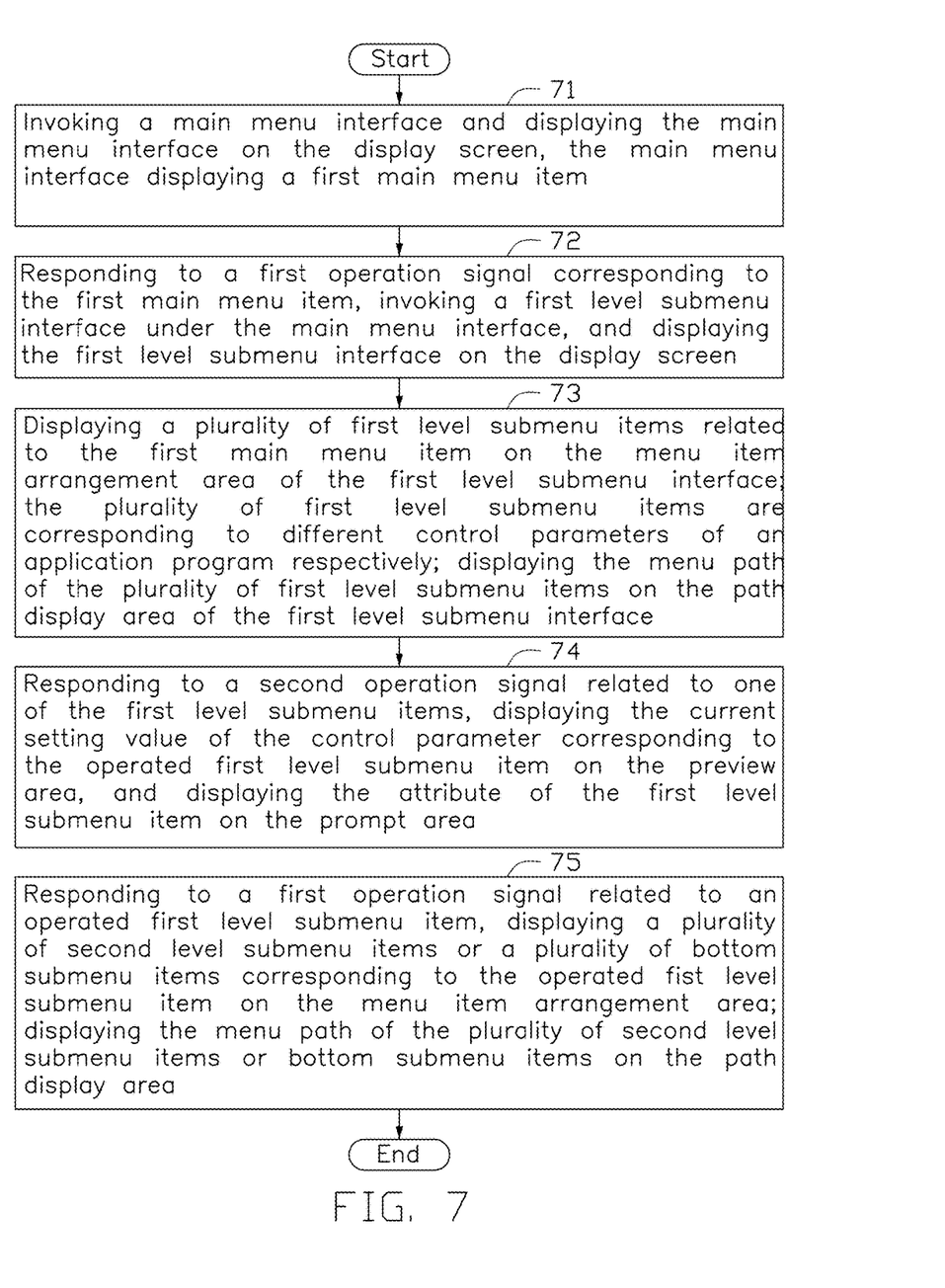
FIG. 7 is a flowchart of an interface display control method according to a preferred exemplary embodiment of the present disclosure.

FIG. 7 is a flowchart of an interface display control method according to a preferred exemplary embodiment of the present disclosure. The method is applied to the electronic device 1, comprising the steps of:

At block 71: The invoking module 101 invokes a main menu interface 201 (see FIG. 2) and displays the main menu interface 201 on the display screen 10. The main menu interface 201 displays a first main menu item 2011 for the user to view and set control parameters of the application programs of the electronic device 1.

At block 72: The invoking module 101 responds to a first operation signal corresponding to the first main menu item 2011, invokes a first level submenu interface 202 under the main menu interface 201 (see FIG. 3), and displays the first level submenu interface 202 on the display screen 10. The first level submenu interface 202 includes a menu item arrangement area 2021, a preview area 2022, a prompt area 2023, and a path display area 2024.

At block 73: The menu item display control module 1031 controls the display screen 10 to display a plurality of first level submenu items 2020 relating to the first main menu item 2011 on the menu item arrangement area 2021. Wherein, the plurality of first level submenu items corresponds to different control parameters of an application program respectively, and the path display control module 1032 controls the display screen 10 to display the menu path of the plurality of first level submenu items 2020 on the path display area 2024.

At block 74: The preview module 1033 responds to a second operation signal relating to one of the first level submenu items 2020, controls the display screen 10 to display the current setting value of the control parameter corresponding to the operated first level submenu item 2020 on the preview area 2022, and displays the attribute of the first level submenu item 2020 on the prompt area 2023.

At block 75: The menu item display control module 1031 responds to a first operation signal relating to an operated first level submenu item 2020, then controls the display screen 10 to display a plurality of second level submenu items 2025 (see FIG. 4) or a plurality of bottom submenu items 2026 (see FIG. 5) corresponding to the operated first level submenu item 2020 on the menu item arrangement area 2021. The path display control module 1032 controls the display screen 10 to display the menu path of the plurality of second level submenu items 2025 or bottom submenu items 2026 on the path display area 2024.

Those skilled in the art will recognize that the above described embodiments are only intended to illustrate the invention and are not intended to limit the invention, and numerous possible modifications and variations within the spirit of the invention will fall within the scope of the invention.

What is claimed is:

1. An electronic device, comprising a processor, a display screen, an input unit, and a non-transitory computer readable medium, the non-transitory computer readable medium storing a plurality of application programs of the electronic device, wherein, the non-transitory computer readable medium stores instructions for the processor to:

invoke a first level submenu interface and display the first level submenu interface on the display screen when the electronic device receives a trigger signal, and the first level submenu interface comprising at least a menu item arrangement area and a preview area;

control the display screen to display a plurality of first level submenu items on the menu item arrangement area, the plurality of first level submenu items corresponding to different control parameters of the plurality of application programs;

respond to a first operation and a second operation of one of the first level submenu items on the first level submenu interface by the user using the input unit, and generate a corresponding first operation signal and a second operation signal, wherein the second operation is different from the first operation;

respond to the second operation signal relating to the operated first level submenu item, and control the display screen to display at least one current setting value of at least one control parameter corresponding to the operated first level submenu item on the preview area; and respond to the first operation signal relating to the operated first level submenu item, and control the display screen to display a plurality of second level submenu items or a plurality of bottom submenu items corresponding to the operated first level submenu item on the menu item arrangement area;

when the number of the at least one control parameter corresponding to the operated first level submenu item is greater than one, respond to the second operation signal, a plurality of current setting values of the control parameters corresponding to the operated first level submenu item are displayed on the preview area, and respond to the first operation signal, the plurality of second level submenu items are displayed on the menu item arrangement area, each of the plurality of second level submenu items is corresponding to one of the control parameters corresponding to the operated first level submenu item; when a first operation to one of the second level submenu items is performed, a plurality of bottom submenu items corresponding to the operated second level submenu item are display on the menu item arrangement area;

when there is only one control parameter corresponding to the operated first level submenu item, respond to the second operation signal, one current setting value of the control parameter corresponding to the operated first level submenu is displayed on the preview area, and respond to the first operation signal, the plurality of bottom submenu items corresponding to the operated first level submenu item are directly displayed on the menu item arrangement area.

2. The electronic device of claim 1, wherein the non-transitory computer readable medium stores instructions for the processor to:

invoke a main menu interface and display the main menu interface on the display screen, the main menu interface displays a first main menu item; generate a first operation signal corresponding to a first operation on the first main menu item; the first operation signal corresponding to the first main menu item is the trigger signal;

respond to the trigger signal and invoke the first level submenu interface under the main menu interface.

3. The electronic device of claim 1, wherein the first level submenu interface further comprises a path display area; the non-transitory computer readable medium stores instructions for the processor to:

control the display screen to display a menu path of the plurality of first level submenu items on the path display area.

4. The electronic device of claim 3, wherein the menu path comprises a thumbnail of the first main menu item.

5. The system of claim 3, wherein the first level submenu interface further comprises a prompt area; the non-transitory computer readable medium stores instructions for the processor to:

display an attribute of the operated first level submenu item on the prompt area.

6. The electronic device of claim 5, wherein a current setting value of the control parameters corresponding to a first one of the first level submenu items on the menu item arrangement area is acquiescently displayed on the preview area, and an attribute of the first one of the first level submenu items on the menu item arrangement area is acquiescently displayed on the prompt area.

7. The electronic device of claim 5, wherein the attribute is a name of the first level submenu item.

8. The electronic device of claim 7, wherein the operated first level submenu item or the acquiescently displayed first one of the first level submenu items is highlighted.

9. The electronic device of claim 3, wherein the non-transitory computer readable medium stores instructions for the processor to:

display a menu path of the plurality of second level submenu items or the bottom submenu items on the path display area.

10. The electronic device of claim 9, wherein the menu path comprises thumbnails of the first main menu item and the operated first level submenu item, and the thumbnails of the main menu item and the operated first level submenu item are listed on the path display area according to an order of operations.

11. The electronic device of claim 1, wherein the input unit comprises a touch screen, the first operation is double-clicking the first level submenu item to open the first level submenu item, and the second operation is single-clicking the first level submenu item to select the first level submenu item.

12. The electronic device of claim 1, wherein the input unit comprises a plurality of mechanical keys, and the first operation and second operation are the user operating different mechanical keys to open and select the first level submenu items.

13. An interface display control method, for being executed in an electronic device, the electronic device comprising a processor, a display screen, an input unit, and a storage unit, the non-transitory computer readable medium storing a plurality of application programs of the electronic device, wherein the method comprises:

invoking a first level submenu interface and display the first level submenu interface on the display screen when the electronic device receives a trigger signal, and the first level submenu interface at least comprising a menu item arrangement area and a preview area;

controlling the display screen to display a plurality of first level submenu items on the menu arrangement area, the plurality of first level submenu items corresponding to different control parameters of the application program respectively;

responding to a first operation and a second operation of one of the first level submenu items on the first level submenu interface by the user using the input unit, and generating a corresponding first operation signal and a corresponding second operation signal, wherein the second operation is different from the first operation;

responding to the second operation signal relating to the operated first level submenu item, and controlling the display screen to display at least one current setting value of at least one control parameter corresponding to the operated first level submenu item on the preview area;

responding to the first operation signal relating to the operated first level submenu item, and controlling the display screen to display a plurality of second level submenu items or a plurality of bottom submenu items corresponding to the operated first level submenu item on the menu item arrangement area;

when the number of the at least one control parameter corresponding to the operated first level submenu item is greater than one, respond to the second operation signal, a plurality of current setting values of the control parameters corresponding to the operated first level submenu item are displayed on the preview area, and respond to the first operation signal, the plurality of second level submenu items are displayed on the menu item arrangement area, each of the plurality of second level submenu items is corresponding to one of the control parameters corresponding to the operated first level submenu item; when a first operation to one of the second level submenu items is performed, a plurality of bottom submenu items corresponding to the operated second level submenu item are display on the menu item arrangement area;

when there is only one control parameter corresponding to the operated first level submenu item, respond to the second operation signal, one current setting value of the control parameter corresponding to the operated first level submenu is displayed on the preview area, and respond to the first operation signal, the plurality of bottom submenu items corresponding to the operated first level submenu item are directly displayed on the menu item arrangement area.

* * * * *